A. E. RHOADES.
FILLING DETECTING MECHANISM FOR LOOMS.
APPLICATION FILED DEC. 4, 1907.
902,324.
Patented Oct. 27, 1908.
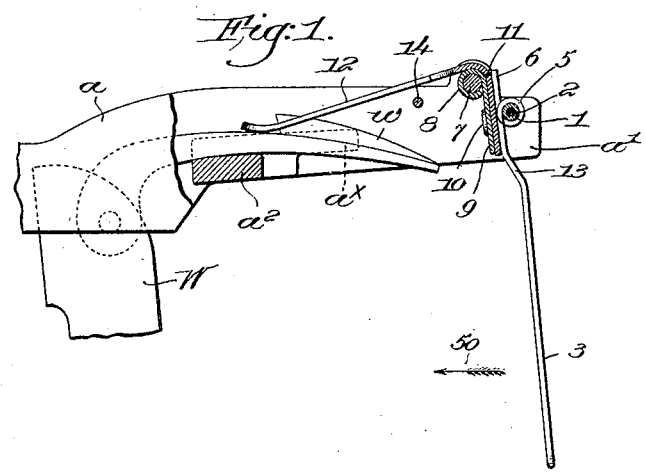
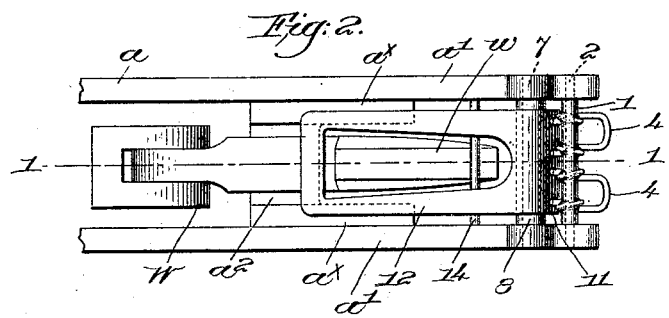
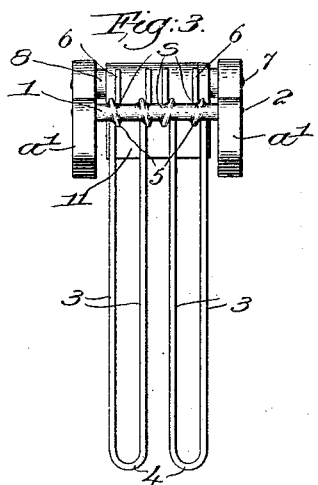
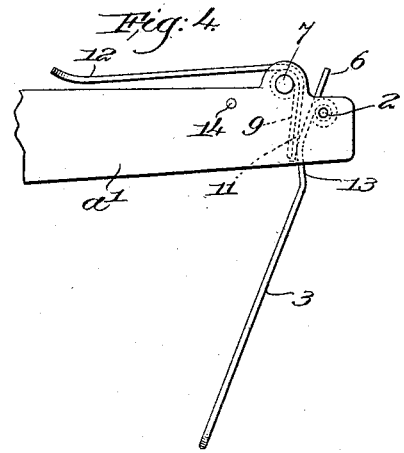
Witnesses,
Edward F. Allen.
Thomas J. Drummond.
Inventor,
Alonzo E. Rhoades,
by Kenerly Gregory
Attys.

UNITED STATES PATENT OFFICE.

ALONZO E. RHOADES, OF HOPEDALE, MASSACHUSETTS, ASSIGNOR TO DRAPER COMPANY, OF HOPEDALE, MASSACHUSETTS, A CORPORATION OF MAINE.

FILLING-DETECTING MECHANISM FOR LOOMS.

No. 902,324.  Specification of Letters Patent.  Patented Oct. 27, 1908.

Application filed December 4, 1907. Serial No. 405,032.

*To all whom it may concern:*

Be it known that I, ALONZO E. RHOADES, a citizen of the United States, and resident of Hopedale, county of Worcester, State of Massachusetts, have invented an Improvement in Filling-Detecting Mechanism for Looms, of which the following description, in connection with the accompanying drawing, is a specification, like letters on the drawing representing like parts.

This invention has for its object the production of novel filling-detecting mechanism for looms, whereby the operation of the fork is improved and its tilting effected with greater ease by the filling. I have also so constructed the fork and its tail or loop in such manner that when the latter is engaged by the hook of the usual vibrator or weft-hammer the fork is not subjected to any strain. This is accomplished by pivotally mounting the fork independently of the loop, the lifting of the latter into inoperative position being effected by tilting of the fork, and I have made provision for a full sweep of the fork with a much smaller angular movement of the loop. The fork is of very simple construction, and of light weight, the tines being made of wire arranged in pairs and connected at their lower ends, so that while very light wire can be used sufficient stiffness is provided.

Figure 1 is a side elevation and partial section on the line 1—1, Fig. 2, of filling-detecting mechanism embodying my invention; Fig. 2 is a top plan view of the outer end of the slide, the fork and the loop; Fig. 3 is a right-hand elevation of the apparatus shown in Fig. 2; Fig. 4 is a side elevation showing the fork tilted and the loop elevated to inoperative position.

The fork-slide $a$ bifurcated at its rear end to present parallel sides $a'$, and the cross-bar $a^2$ to support the hook $w$ of the vibrator or weft-hammer W, partly shown in Fig. 1, may be of substantially usual construction.

I have herein shown the fork and its loop or tail as separate, the fork comprising a tubular metallic sleeve 1 loosely mounted on a fulcrum pin 2 supported fixedly in the sides $a'$ of the slide, and depending tines arranged in pairs connected at their lower ends and secured at their upper ends to the body.

To make the tines I take a piece of wire and bend it into substantial U-shape, Fig. 3, presenting straight, parallel portions 3 connected laterally at their lower ends, at 4, and the upper ends of the wire are wound around the body 1, at 5, and fixedly secured thereto, as by solder $s$.

Two of the connected pairs of tines are shown in Figs. 2 and 3, the free ends of the wires being carried up beyond the body, at 6. By making the fork in this manner light wire can be used, resulting in great sensitiveness, while the bracing of the tines by connecting them at their upper and lower ends affords the requisite stiffness or rigidity. The fork operates with great ease, on account of its light weight, so that there are less mistakes in its action.

Above and forward of the fulcrum 2 I secure a second fulcrum pin 7, on which I loosely mount a metallic sleeve 8 having a tongue 9, to which latter is secured, as by rivets 10, a downturned extension 11 of the loop 12, said loop and its extension being made from sheet metal.

The loop at its free end is adapted to rest upon the ledges or ribs $a^\times$ on the sides of the fork-slide, and the extension 11 contacts with and slidingly engages the fork tines a short distance below the fulcrum 2, the tines being slightly offset or bent thereat, at 13, as shown in Figs. 1 and 4.

The distance between the fulcrum 2 and the point of engagement of the extension with the tines is considerably less than the distance from such point to the fulcrum 7 of the loop 12.

When the fork is tilted by engagement with the filling and moves in the direction of arrow 50, Fig. 1, the loop will be lifted out of the path of the hook $w$.

Owing to the nearness of the point of engagement of the extension 11 with the tines to the fork fulcrum 2 and to the offset or bend 13 the arc through which the extension will be swung is small, but sufficient to prevent coöperation of the loop and hook whenever the fork is tilted. The fork can thus swing through an arc of considerable amplitude while the elevation of the loop is through a much smaller angle, as shown in Fig. 4, tending to obviate any tendency to rebound.

As the loop is of light weight its movement is readily effected by or through tilting of the fork, and as said loop is separate from the fork no strain is transmitted to the latter upon engagement of the loop by the hook w if the filling fails.

To limit upward movement or jumping of the loop I provide a stop 14, fixed in the arms a' of the fork-slide and in the path of the extension 9 to stop it, should the loop be thrown upward suddenly to an improper extent.

The upturned ends 6 of the fork tines are arranged to engage the upper part of the extension 9 and thereby prevent any improper swing of the fork in a direction opposite to arrow 50, Fig. 1.

Referring to Fig. 4 it will be seen that when the fork is swung well forward the bend at 13 engages the extension 11 and approaches the fulcrum 7, lessening the upward throw of the loop by the tilting of the fork.

My invention may be modified in various particulars by those skilled in the art without departing from the spirit and scope of my invention as set forth in the appended claims.

Having fully described my invention, what I claim as new and desire to secure by Letters Patent is:—

1. In filling detecting mechanism for looms, a slide, a loop fulcrumed thereon and having a depending, short extension adjacent its fulcrum, and a filling-fork separately fulcrumed on the slide, the extension of the loop slidingly engaging the tines between their fulcrum and their lower end.

2. In filling detecting mechanism for looms, a slide, a loop and a fork separately fulcrumed thereon, said fork comprising a body and attached depending tines connected in pairs at their lower ends, means to lift the loop by or through tilting of the fork, and a stop to limit lifting movement of the loop.

3. A filling-fork for looms, comprising a tubular body, and a plurality of pairs of tines depending therefrom, each pair consisting of a U-shaped piece of metal having the free upper ends of its sides wound around and fixedly secured to the body, the tines of each pair being integrally connected at their lower ends and separated laterally from the adjacent pair of tines.

4. A filling-fork for looms, comprising a tubular body, and depending tines consisting of a plurality of U-shaped pieces of wire wound around the tubular body at their upper ends and soldered fixedly thereto, the upper ends of the tines projecting above the body, and a loop fulcrumed independently of the fork and having an extension against which the upper ends of the tines engage, to prevent improper swing of the fork, the depending end of the extension slidingly engaging the tines between their fulcrum and their lower end.

5. In filling detecting mechanism for looms, a slide, a sheet metal loop fulcrumed thereon and having a depending, short extension adjacent its fulcrum, and a filling-fork separately fulcrumed on the slide and having pairs of wire tines connected at their lower ends, the extension of the loop slidingly engaging the tines between their fulcrum and their end.

6. The combination, with a slide, of a filling-fork fulcrumed thereon, a loop fulcrumed on the slide independently of the fork and above the fulcrum of the same, and a depending extension movable with the loop and engaging the fork adjacent its fulcrum, whereby the tilting of the fork elevates the loop but through a less angle.

7. The combination, with a slide, of a filling-fork fulcrumed thereon, a loop fulcrumed on the slide independently of the fork, and an extension on the loop in sliding engagement with the fork tines at a distance from its fulcrum less than the distance between the loop fulcrum and the end of said extension, the fork tines being bent adjacent the lower edge of the extension.

In testimony whereof, I have signed my name to this specification, in the presence of two subscribing witnesses.

ALONZO E. RHOADES.

Witnesses:
GEORGE OTIS DRAPER,
ERNEST W. WOOD.